United States Patent
Cooper et al.

(10) Patent No.: US 10,073,856 B1
(45) Date of Patent: Sep. 11, 2018

(54) CONTINUOUS REPLICATION FOR SECURE DISTRIBUTED FILESYSTEMS

(71) Applicant: Qumulo, Inc., Seattle, WA (US)

(72) Inventors: Ezra Elias Kilty Cooper, Seattle, WA (US); Neal Thomas Fachan, Seattle, WA (US); Junjie Liang, Seattle, WA (US); Kevin Ross O'Neill, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 15/967,499

(22) Filed: Apr. 30, 2018

(51) Int. Cl.
*H04L 29/06* (2006.01)
*G06F 17/30* (2006.01)

(52) U.S. Cl.
CPC .. *G06F 17/30174* (2013.01); *G06F 17/30088* (2013.01); *G06F 17/30215* (2013.01); *H04L 63/08* (2013.01); *H04L 63/126* (2013.01)

(58) Field of Classification Search
CPC ............. G06F 17/30174; H04L 9/1095; H04L 9/5072; H04L 63/08
See application file for complete search history.

(56) References Cited

U.S. PATENT DOCUMENTS

| | | | | |
|---|---|---|---|---|
| 6,772,435 | B1 * | 8/2004 | Thexton | H04N 7/16 348/E7.054 |
| 8,108,429 | B2 * | 1/2012 | Sim-Tang | G06F 17/30085 707/648 |
| 8,448,170 | B2 * | 5/2013 | Wipfel | H04L 9/3213 718/1 |
| 9,158,653 | B2 * | 10/2015 | Gold | G06F 11/3457 |
| 9,171,145 | B2 * | 10/2015 | Dash | G06F 21/44 |

* cited by examiner

*Primary Examiner* — Dao Q Ho
(74) *Attorney, Agent, or Firm* — John W. Branch; Lowe Graham Jones PLLC

(57) ABSTRACT

Embodiments are directed to file systems. A replication engine may establish a secure communication channel between a source file system and a target file system. The replication engine may: instantiate a replication job associated with rules; determine changes in the source file system; determine characteristics of the replication job that may be based on the changes; compare the to the characteristics and a black-out schedule; execute the replication job to communicate the changes in the source file system to the target file system based on a result of the comparison. Upon completion of the replication job, the replication engine may automatically instantiating a next replication job to copy subsequent changes in the source file system to the target file system.

22 Claims, 8 Drawing Sheets

CONTINUOUS REPLICATION FOR SECURE DISTRIBUTED FILESYSTEMS

TECHNICAL FIELD

The present invention relates generally to file systems, and more particularly, but not exclusively, to managing file system replication in a distributed file system environment.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may require various backup or restore operations. However, the size of or the distributed nature of a modern hyper-scale file systems may make it difficult to establish suitable replication or backup schedules since clients or users across the networks may be performing various asynchronous state changes to the file system or its content. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
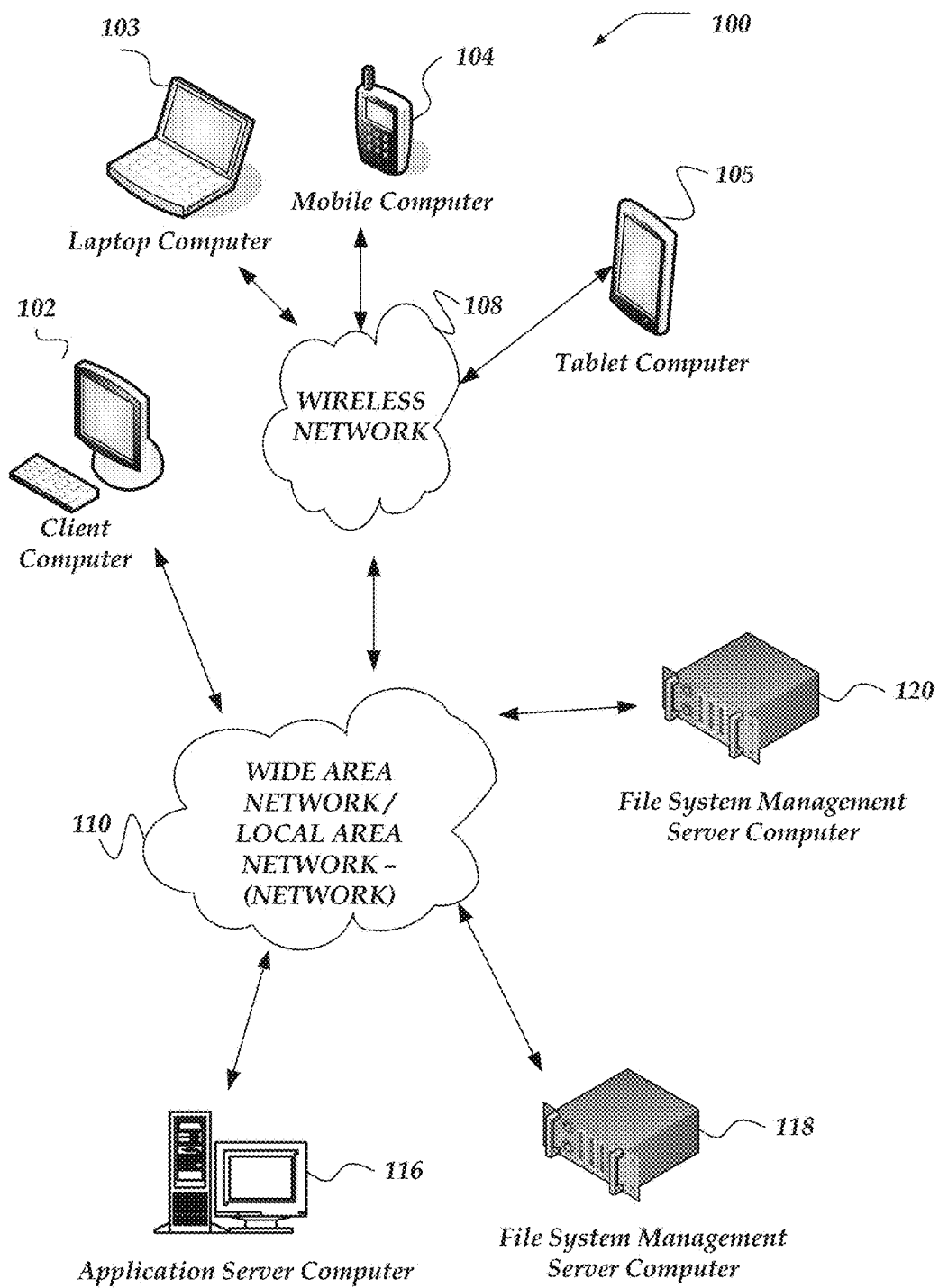
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object," or "object" refer to entities stored in a file system. These may include files, directories, or the like. In this document for brevity and clarity all objects stored in a file system may be referred to as file system objects.

As used herein the term "snapshot" refers to a point time version of the file system or a portion of the file system. Snapshots preserve the version of the file system objects at the time the snapshot was taken. Snapshots may be sequentially labeled such that snapshot 1 is the first snapshot taken in a file system and snapshot 2 is the second snapshot, and so on. The sequential labeling may be file system-wide even though snapshots may cover the same or different portions of the file system. Snapshots demark the end of the current file system epoch and the beginning of the next file system epoch. Accordingly, in some embodiments, if a file system is arranged to number epochs and snapshots sequentially, the epoch count or its number label may be assumed to be one less than the count or number label of the newest snapshot. Note, this assumption may not hold if one or more of the latest snapshots are deleted. Though it is true that if a new snapshot is created, it may be assigned a number label that is the same as the epoch it closes and thus be one less than the new current epoch.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, a replication engine may be instantiated to perform various actions, for continuous replication for secure distributed file systems.

In one or more of the various embodiments, the replication engine may establish a secure communication channel between a source file system and a target file system that may be based on one or more handshake messages such that the one or more handshake messages may include source authentication information signed and target authentication information. In one or more of the various embodiments, establishing the secure channel may include: verifying the target authentication information at the source file system; verifying the source authentication information at the target file system; and communicating an acknowledgement message from the source file system to the target file system, wherein the secure communication channel is established after the acknowledgement message is verified at the target file system. In one or more of the various embodiments, the source authentication information may be signed using a one-time-secret (OTS) and the target authentication information is signed using the same OTS.

In one or more of the various embodiments, the replication engine may instantiate a replication job that may be associated with one or more rules. In one or more of the various embodiments, the replication engine may determine one or more changes in the source file system.

In one or more of the various embodiments, the replication engine may determine one or more characteristics of the replication job that may be based on the one or more changes.

In one or more of the various embodiments, the replication engine may compare the one or more rules to the one or more characteristics and a black-out schedule.

In one or more of the various embodiments, the replication engine may execute the replication job to communicate the one or more changes in the source file system to the target file system based on a result of the comparison. In one or more of the various embodiments, executing the replication job may include: delaying the execution of the replication job based on one or more of a processor utilization value, a network utilization value, a network quality value, a size of the one or more changes, or the like; and delaying the execution of the replication job until the expiry of a black-out period.

In one or more of the various embodiments, in response to completion of the replication job, the replication engine may automatically instantiate a next replication job to copy subsequent changes in the source file system to the target file system.

In one or more of the various embodiments, the replication engine may pause the execution of the replication job to avoid communicating the one or more changes during a black-out period. And, replication engine may restart the execution of the replication job at the conclusion of the black-out period.

In one or more of the various embodiments, the replication engine may provide a one-time-secret (OTS) based on entropy information collected by one or more sensors. And, in one or more of the various embodiments, the replication engine may share the OTS with both the source file system and the target file system for verifying source authentication information and target authentication information.

In one or more of the various embodiments, the replication engine may provide a snapshot of the source file system that may be associated with a current state of the source file system. And, restricting the one or more changes to changes associated with the snapshot.

In one or more of the various embodiments, the replication engine may provide a minimum delay between each replication job such that the minimum delay may be based on an age of the one or more changes. And, in one or more of the various embodiments, in response to the age of the one or more changes being less than the minimum delay, delaying the execution of the next replication job.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, application server computer 116, file system management server computer 118, file system management server computer 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, and/or results provided by file system management server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, file system management server computer 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116, file system management server computer 118, or file system management server computer 120 are described in more detail below in conjunction with FIG. 3. Although FIG. 1 illustrates application server computer 116, file system management server computer 118, and file system management server computer 120, each as a single computer, the innovations and/or embodiments are not so limited. For example, one or more functions of application server computer 116, file system management server computer 118, file system management server computer 120, or the like, may be distributed across one or more distinct network computers. Moreover, in one or more embodiments, file system management server computer 118 or file system management server computer 120 may be implemented using a plurality of network computers. Further, in one or more of the various embodiments, application server computer 116, file system management server computer 118, file system management server computer 120, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
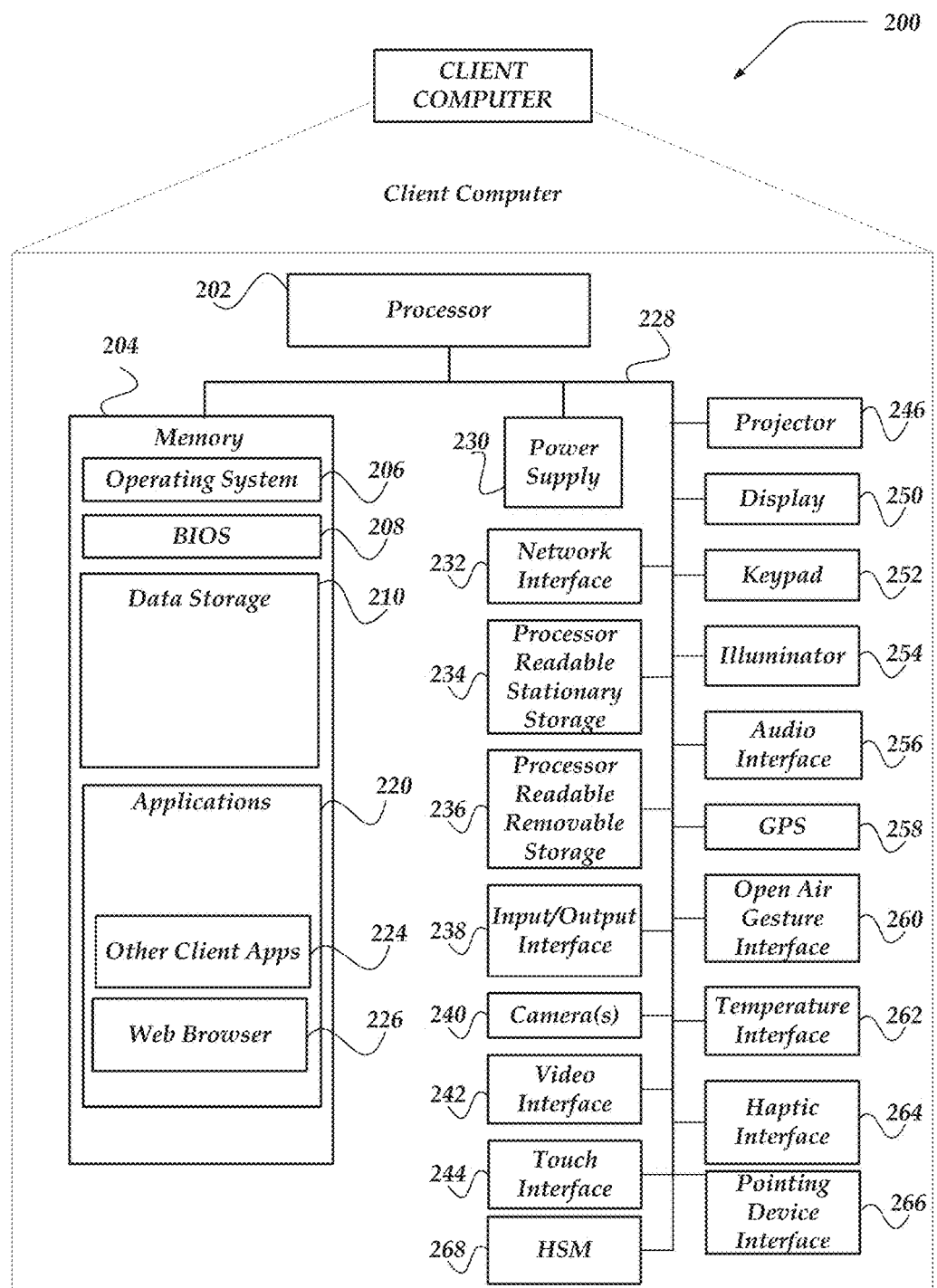
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in file system object meta-data, file system objects, file systems, user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, other client applications 224, web browser 226, or the like. Client computers may be arranged to exchange communications, such as, file system operations, file system administration, file access, queries, searches, messages, notification messages, event messages, alerts, performance metrics, log data, API calls, or the like, combination thereof, with application servers and/or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
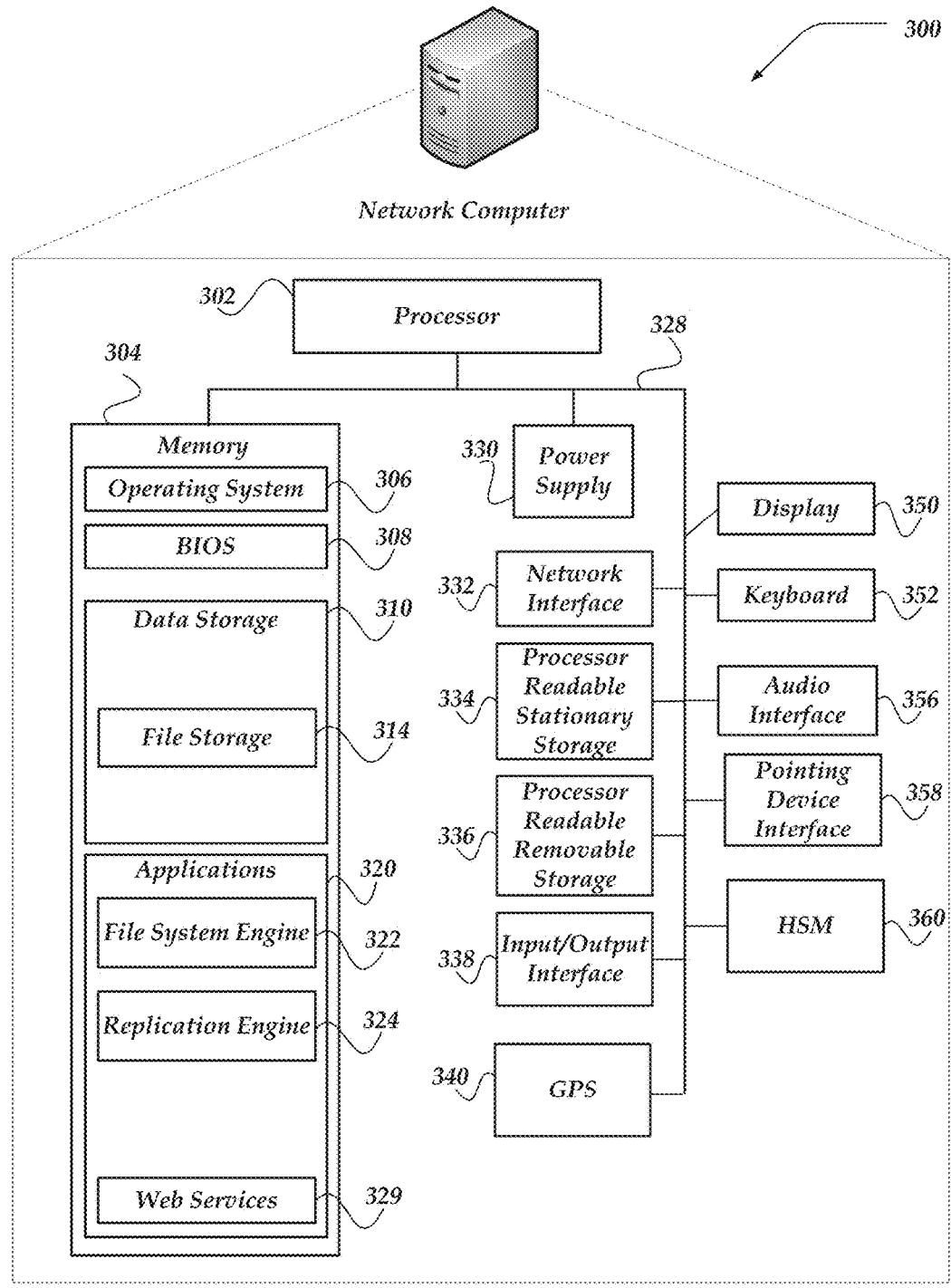
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, file system management server computer 118, or file system management computer 120 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, replication engine 324, web services 329, or the like, may be arranged to employ geo-location information to select one or more localization features, such as, time zones, languages, currencies, calendar formatting, or the like. Localization features may be used in file system meta-data, file system objects, file systems, user-interfaces, reports, as well as internal processes and/or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, or the like. File storage 314 may store files, documents, versions, properties, file meta-data, data structures, replication data, or the like, that represent one or more portions of a distributed file system.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, replication engine 324, web services 329, or the like, that may be arranged to perform actions for embodiments described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, file system engine 322, replication engine 324, web services 329, or the like, may be operative in a cloud-based computing environment. In one or more of the various embodiments, these applications, and others, that comprise the management platform may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to file system engine 322, replication engine 324, web services 329, or the like, may be provisioned and de-commissioned automatically.

Also, in one or more of the various embodiments, file system engine 322, replication engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
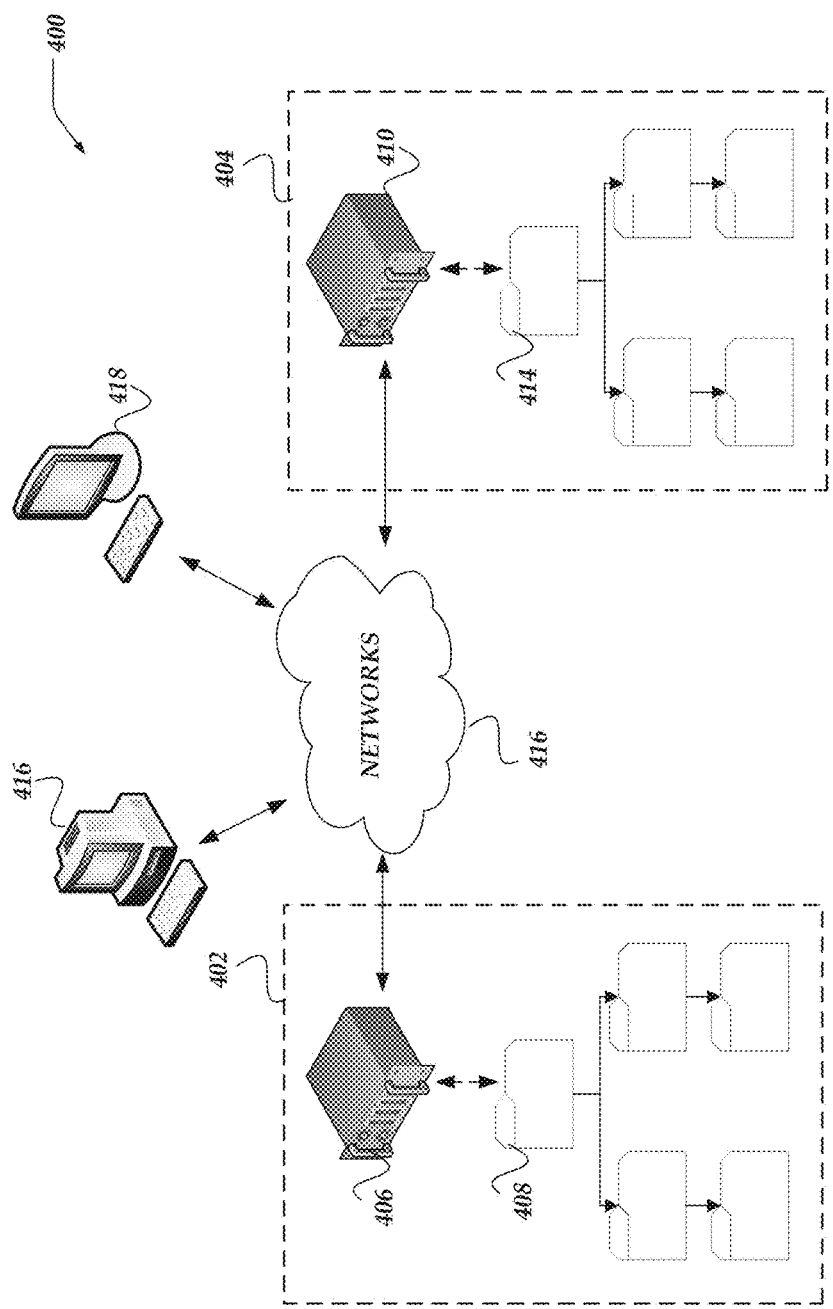
FIG. 4 illustrates a logical architecture of a system for continuous replication for secure distributed file systems in accordance with one or more of the various embodiments.

FIG. 4 illustrates a logical architecture of system 400 for continuous replication for secure distributed file systems in accordance with one or more of the various embodiments. In one or more of the various embodiments, file systems, such as, file system 402 and file system 404 may be arranged to be communicatively coupled to one or more networks, such as, networks 416. Accordingly, in one or more of the various embodiments, one or more clients, such as, client computer 416 and client computer 418 may be arranged to access file system 402 or file system 404 over networks 416. In some embodiments, clients of file system 402 or file system 404 may include users, services, programs, computers, devices, or the like, that may be enabled to perform one or more file system operations, such as, creating, reading, updating, or deleting data (e.g., file system objects) that may be stored in file system 402 or file system 404. In some embodiments, file system 402 or file system 404 may comprise one or more file system management computers, such as file system management computer 406 or file system management computer 410. Also, in one or more of the various embodiments, file systems, such as file system 402 or file system 404 may include one or more file system objects, such as file system object 408 or file system object 414. file system object 412 or file system object 414 may represent the various objects or entities that may be stored in file system 402 or file system 404. In some embodiments, file system objects may include, files, documents, directories, folders, change records, backups, snapshots, replication information, versions, branches, or the like.

In one or more of the various embodiments, the implementation details that enable file system 402 or file system 404 to operate may be hidden from clients, such that they may be arranged to use file system 402 or file system 404 the same way they use other file systems, including local file systems. Accordingly, in one or more of the various embodiments, clients may be unaware that they are using a file system that supports continuous replication because file system engines or replication engines may be arranged to mimic the interface or behavior of standard file systems.

Also, while file system 402 and file system 404 are illustrated as using one file system management computer each with one set of file system objects, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

In one or more of the various embodiments, one or more clients may be configured to be administrators that may have roles that enable a varying degree of administrative powers to administer file system objects. In one or more of the various embodiments, administrators may be enabled to established the various rule-based policies that are enforced by one or more file system engines that may be running on the one or more file system management computers.

In some embodiments, one or more replications engines may be running on a file system management computer, such as, file system management computer 406 or file system management computer 410. In some embodiments, replication engines may be arranged to perform actions to provide secure continuous replication of one or more portions of one or more file systems.

In one or more of the various embodiments, it may be desirable to configure file systems, such as, file system 402 to be replicated onto one or more different file systems, such as, file system 404. In some cases, typically users may be required to manually establish schedules for performing replication operations. Accordingly, users may have to decide how often to perform replication operations (e.g., hourly, daily, weekly, or the like). In some cases, manually selecting a scheduled time to perform replication operations may be complicated by various factors, including, other tasks competing for resources, handling canceled or failed replication jobs, or the like.

Further, in some cases, replication operations may require copy a very large amount of data from one file system to another. Whereas, in other cases, replication operations between the same file systems may require very little data transfer. Accordingly, manually selecting a fixed replication schedule that can accommodate both cases may require setting a relatively long-time between replication jobs. Thus, in some cases, if the replication schedule is set to accommodate very large replication operations that may take many hours, data associated with short-running replication operations may be vulnerable to loss in between scheduled replication operations.

In contrast, if the replication schedule is set with too high of a frequency, replication jobs may stack up or otherwise delayed because of long running replication jobs that have runtimes that run into the beginning of the next replication slot. Also, in some cases, having a fixed replication schedule may result in replication jobs starving other important jobs of resources or network bandwidth.

Also, in some cases, replication operations may require communication across one or more unsecure internal or external networks (e.g., the internet). Accordingly, in some cases, users may be required to perform complicated setup configuration to establish the required secure channel for community replication data from a source file system to a target file system. For example, users may be required to manually perform actions, such as, setting up VPNs, distributing PKI certificates or keys, managing shared keys or shared secrets, or the like. While these kind of actions are generally well-known to advanced users with sufficient security and network knowledge, their complexity may be disadvantageous to an organization because of the valuable time of their skilled security or network personnel may have to be used maintaining secure channels for replication operations.

However, in one or more of the various embodiments, a replication engine may be arranged to continuously replicate files or other file system changes from a source file system to a target file system. Accordingly, in some embodiments, the replication engine may instantiate and execute one or more replication jobs that may run to completion and then one or more next replication jobs may be executed. In one or more of the various embodiments, the replication jobs may run automatically without adherence to a predefined or fixed schedule. In one or more of the various embodiments, users simply establish the replication relationship between the source file system and the target file system.

In one or more of the various embodiments, the replication engine may be arranged to enable users to associate a source file system with the target file system. In one or more of the various embodiments, users may identify a portion of the source file system and a location in the target file system.

In one or more of the various embodiments, the replication engine may automatically perform actions to establish a secure communication channel between the source file system and the target file system. In some embodiments, establishing the secure communication channel may include associating source authentication information with the source file system and target authentication information with the target file system.

In one or more of the various embodiments, source authentication information may be stored at the target file system. Likewise, in one or more of the various embodiments, target authentication information may be stored at the source file system. Accordingly, in one or more of the various embodiments, messages of data provided by the source file system to the target file system may be validated and authenticated at the target file system based on the source authentication information.

Further, in one or more of the various embodiments, establishing secure communication channels between the source file system and the target file system subsequent to the initial channel may be performed using the stored source authentication information and the stored target authentication information rather than requiring handshake protocol and a new one-time-secret.

In one or more of the various embodiments, authentication information may be information such as, public key infrastructure information, cryptographic keys, cryptographic certificates, cipher information, protocol information, or the like, or combination thereof. In some embodiments, some or all of the authentication information may be fingerprint information rather than copies of the authentication information. For example, if the source file system and target file system use cryptographic certificates to authenticate exchanged messages, the authentication information may be fingerprint information associated with meta-data associated with the certificates rather than the certificates themselves. Accordingly, a replication engine may be arranged provide fingerprint information associated with the source file system to the target file system and provide fingerprint information associated with the target file system to the source file system.

In one or more of the various embodiments, a replication engine may be arranged to provide fingerprint information based on executing a hash function on one or more fields or property values associated with the authentication information. For example, if PKI digital certificates are used to establish secure communication channels, the replication engine may be arranged to provide a fingerprint value based on hashing one or more certificate property values, such as, issuer, validity dates, public key value, serial number, or the like. E.g., a fingerprint FP may be generated as follows: FP=H(a, b, c, . . . , z) where H is a cryptographic hashing function; and a, b, c, . . . , z are field values from the authentication information.

In one or more of the various embodiments, a replication engine may be arranged to associated one or more rules with some or all replication relationships or replication jobs. In one or more of the various embodiments, such rules may enable the replication engine to provide operational flexibility to accommodate the complexity or variety associated with many modern file systems. In one or more of the various embodiments, one or more rules may be global with respect to the organization. Likewise, one or more rules may be associated with particular replication relationships.

Further, in one or more of the various embodiments, one or more replication rules may be associated a source file system, a target file system, or portions thereof. The particular rules associated with a portion of a file system may depend on various factors, including the contents of the file system, the network route between a source file system and a target file system, the physical or geographical location of the respective file systems, the physical hardware or virtual hardware associated with the physical or virtual machines hosting the respective file systems.

In one or more of the various embodiments, one or more rules may define black-out periods the define time periods where continuously replication job may be paused or delayed. In some embodiments, this enables organizations to restrict replication operations from occurring while critical operations may be occurring. Black-out periods enable organizations to ensure that some of all replication jobs are prevented from interfering other critical operations by consuming network bandwidth, file system I/O bandwidth, compute or processing resources, or the like, combination thereof.

For example, in one or more of the various embodiments, if an organization knows that its most of its customer activity occurs between 8:00 a.m. and 9:00 a.m. and 11:30 a.m. and 1:00 p.m., black-out periods may be defined to correspond with those time periods. Accordingly, in this example, in one or more of the various embodiments, the organization may be assured that replication operations will not interfere with its busiest time for customer interactions.

Also, in one or more of the various embodiments, black-out periods may be defined during periods of time where it is known that a source file system may experience many changes in a short time window. Thus, in this example, in some embodiments, the replication engine may be enabled to collect several changes that have occurred in a short time period and replicate them on the target file system using one replication job. For example, if a replication engine is configured to continuously replication changes, defining a black-out period that covers the last hour of the work day may enable the replication engine to collect the many changes saved to the source file system at the end of the work day as employees close files and head home.

In one or more of the various embodiments, black-out periods may be assigned at different times depending on the day of the week, month of the year, holidays, upcoming events, or the like, or combination thereof.

In one or more of the various embodiments, a file system engine or replication engine may be arranged monitor one or more metrics associated with the performance or performance characteristics of source file systems, target file systems, applications, networks, services, network computers, network devices, or the like. In some embodiments, one or more third-party or external services (e.g., separate from the file systems, file system engine, or replication engine) may perform the monitoring or provide the performance metrics.

Accordingly, in one or more of the various embodiments, the replication engine may compare the metrics to various rules that may be associated with source file system, target file systems, replication jobs, or the like, to determine one or more aspects related to replication operations. In one or more of the various embodiments, rules may be comprised of instructions, defined threshold values, conditions, patterns (for matching), or the like. In some embodiments, one or more rules may include various elements, such as, sub-rules, branching, looping, timers, sub-routines, data structures, regular expressions, scripting, or the like, or combination thereof. In one or more of the various embodiments, rules may be loaded from configuration files, databases, provided based on user-input, or the like. In one or more of the various embodiments, one or more rules defined using various computer programming languages, such as, Go, Python, Perl, C, C++, C#. Java, Javascript, Haskell, Ruby, Scala, custom languages, or the like, or combination thereof.

Also, in one or more of the various embodiments, one or more rules may be implemented as Application Specific Integrated Circuits (ASICs), Field Programmable Gate Arrays (FPGAs), Programmable Array Logic (PALs), or the like, or combination thereof.

In one or more of the various embodiments, the applications or duration of black-out periods may be associated with one or more rules. For example, in one or more of the various embodiments, a rule may be defined to extend a black-out period if one or more metrics associated with customer activity exceed one or more threshold values. Likewise, in some embodiments, black-out periods may be associated with one or more rules that enable one or more replication jobs execute during the black-out period. For example, a black-out periods may be associated with rules that restrict replication jobs unless they meet one or more conditions, such as, job size, content type, job priority, or the like. In one or more of the various embodiments, rules may be defined to ignore some black-out periods if the age of one or more changes exceeds a threshold value. For example, there may be a rule that causes a black-out period to be ignored if a replication job includes changes that are more than four hours old.

Also, in some embodiments, the replication engine may be configured to skip a replication job or black-out period based on the size of a job. In one or more of the various embodiments, a replication engine may be arranged to determine how many changes, files, or the like, may be part of a replication job before executing the replication job. Accordingly, in some embodiments, the replication engine may evaluate whether to execute the replication job or delay it. For example, if there are few (or none) changes in the source file system that needs to communicated to the target file system, the replication engine may be arranged to delay a replication job until there are more changes to communication to the target file system.

Likewise, in one or more of the various embodiments, the replication engine may be arranged to ignore a black-out period it determines the a particular replication job meets certain criteria. For example, if a black-out period is intended to avoid disrupting customer activity, the replication engine may be configured to execute replication jobs that are expected to have little or no impact on customer activity rather honor the black-out period.

Generalized Operations

FIGS. 5-8 represent generalized operations for continuous replication for secure distributed file systems in accordance with one or more of the various embodiments. In one or more of the various embodiments, processes 500, 600, 700, and 800 described in conjunction with FIGS. 5-8 may be implemented by and/or executed by one or more processors on a single network computer (or network monitoring computer), such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 5-8 may be used for continuous replication for secure distributed file systems in accordance with at least one of the various embodiments and/or architectures such as those described in conjunction with FIG. 4. Further, in one or more of the various embodiments, some or all of the actions performed by processes 500, 600, 700, and 800 may be executed in part by file system engine 322, or replication engine 324 running on one or more processors of one or more network computers.

Figure 5:
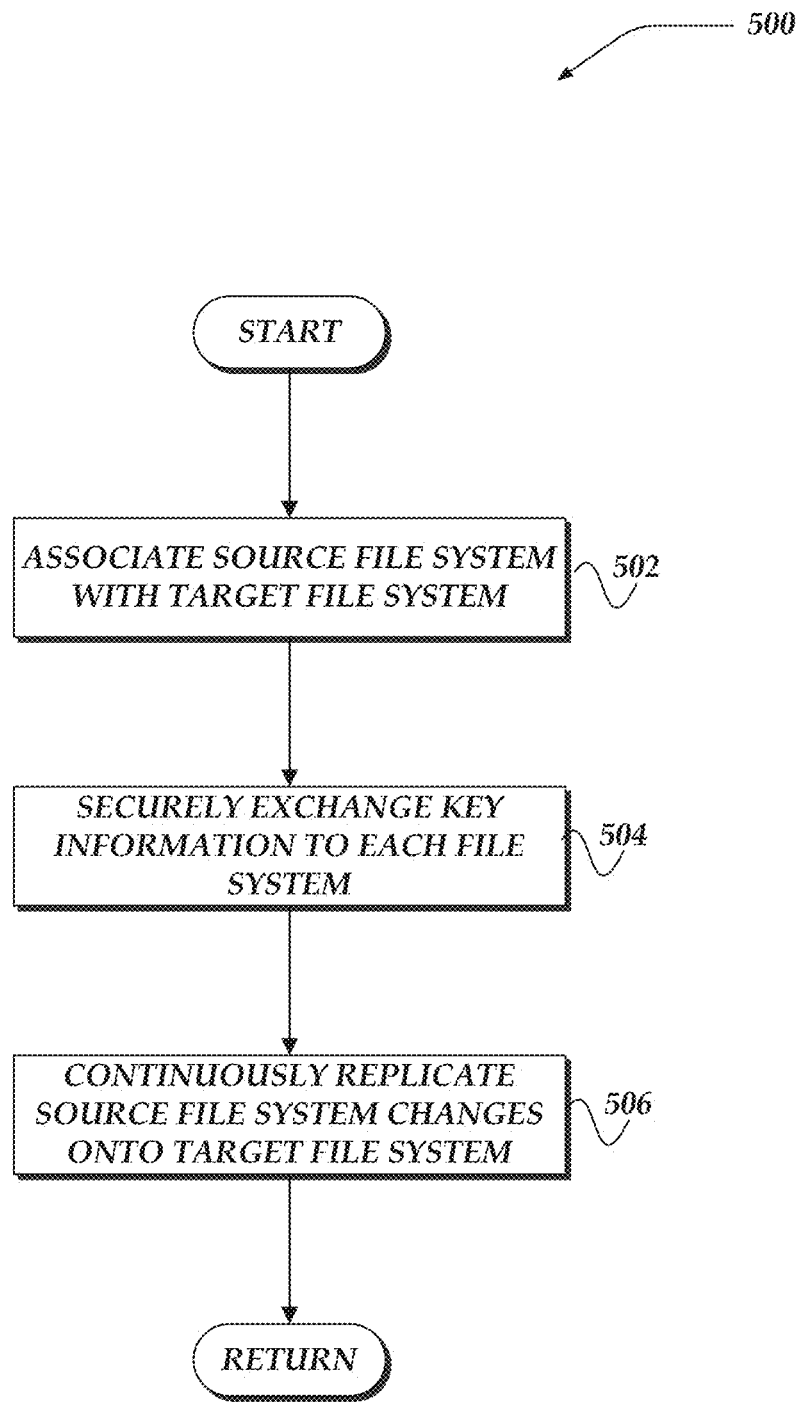
FIG. 5 illustrates an overview flowchart of a process for continuous replication for secure distributed file systems in accordance with one or more of the various embodiments.

FIG. 5 illustrates an overview flowchart of process 500 for continuous replication for secure distributed file systems in accordance with one or more of the various embodiments. After a start block, at block 502, in one or more of the various embodiments, one or more replication engines may be instantiated to associate a source file system with a target file system. In one or more of the various embodiments, as described above, one or more replication relationships may be established between one or more source file systems and one or more target file systems. In one or more of the various embodiments, each replication relationship may associate one or more portion of the source file system with a location in a target file system.

At block 504, in one or more of the various embodiments, the one or more replication engines may be arranged to securely exchange key information to the source file system and the target file system. In one or more of the various embodiments, establishing the replication relationship may include executing a handshake protocol between the source file system and the target file system. In one or more of the various embodiments, the handshake protocol may enable the establishment of a secure communication channel that may be used to communicate one or more changes from the source file system to the target file system.

At block 506, in one or more of the various embodiments, the one or more replication engines may be arranged to continuously replicate changes to the source file system on the target file system. In one or more of the various embodiments, the replication engine may be arranged to continuously instantiate replication jobs that collect changes made in the source file system and communication them to a target file system. In one or more of the various embodiments, as one replication job completes the replication engine may be arranged to instantiate a next replication job. Accordingly, in one or more of the various embodiments, changes made in the source file system are continuously replicated to the target file system rather than require users to establish particular replication schedules.

In one or more of the various embodiments, replication engines may be arranged to take into account black-out periods, minimum delays, replication rules, or the like, that may affect when or if a replication jobs executes. Next, control may be returned to a calling process.

Figure 6:
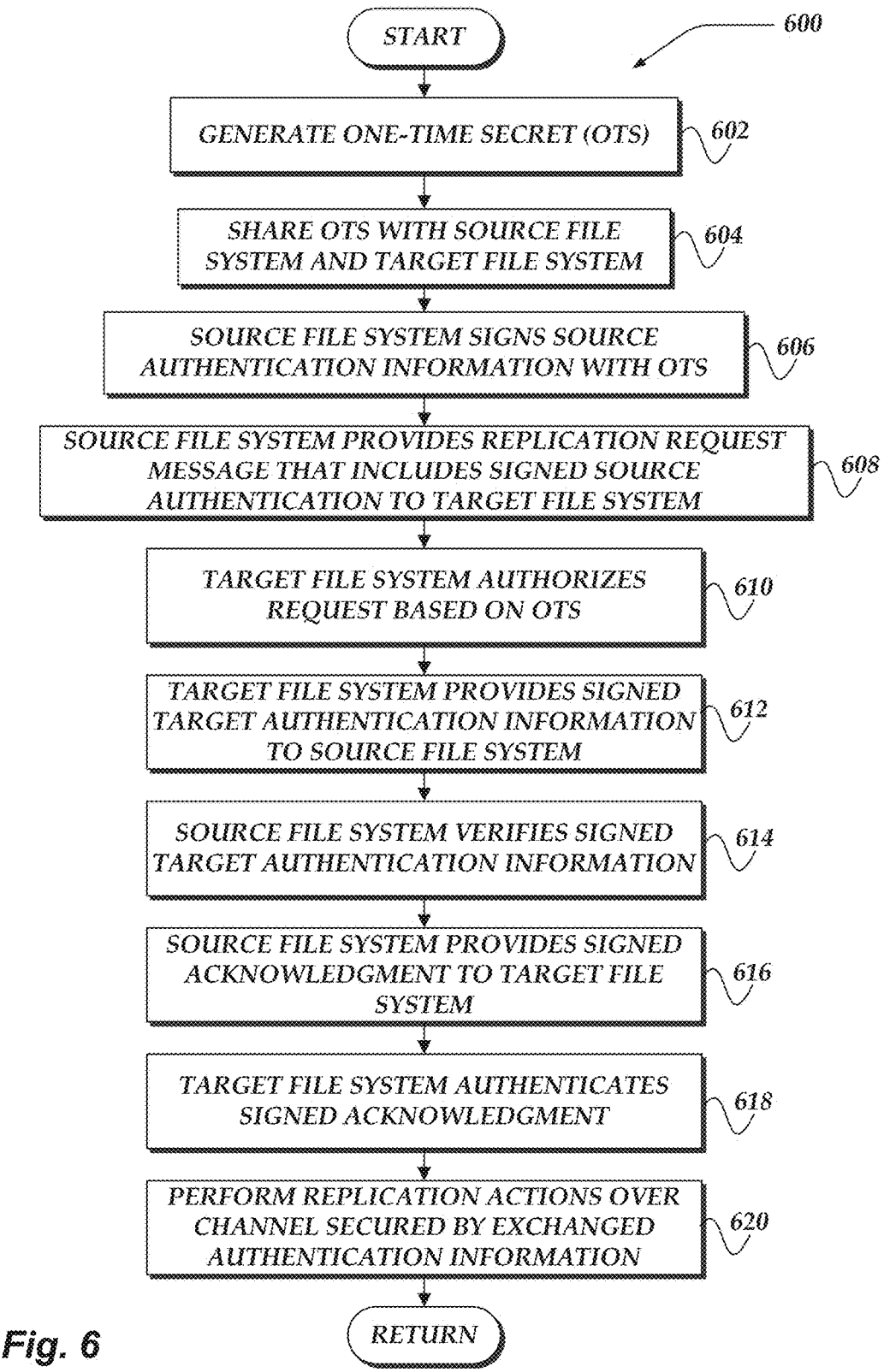
FIG. 6 illustrates a flowchart of a process for handshake protocol to establish a secure communication channel for continuous replication in accordance with one or more of the various embodiments.

FIG. 6 illustrates a flowchart of process 600 for handshake protocol to establish a secure communication channel for continuous replication in accordance with one or more of the various embodiments. After a start block, at block 602, in one or more of the various embodiments, one or more replication engines may be instantiated to generate a one-time-secret (OTS). In some embodiments, the OTS may be a pass phrase or other secret created by a user. In one or more of the various embodiments, the OTS may be a cryptographically secure random number. Likewise, in some embodiments, the OTS may be based on a combination of a user provided pass phrase and a automatically generated nonce.

In some embodiments, the replication engine may be arranged to obtain entropy information from one or more sensors that may be used to generate the OTS as well as other random numbers that may be required by the handshake protocol.

At block 604, in one or more of the various embodiments, the one or more replication engines may be arranged to share the OTS with a source file system and target file system. In one or more of the various embodiments, the OTS may be shared with the source file system and the target file system using a handshake protocol via a communication process or channel that may be out-of-band or otherwise separate from the secure communication channel used to communicate changes from the source file system to the target file system.

In one or more of the various embodiments, the replication engine may communicate the OTS to the source file system and the target file system over a network using a standard secure communication protocol, such as, TLS, or the like.

In one or more of the various embodiments, the OTS may be hashed or encrypted using a secondary protocol known to the replication engine and available at the source file system and the target file system. Note, in some embodiments, both the source file system and the target file system may have replication engines or portions of replication engines execute at their location. Accordingly, in one or more of the various embodiments, the replication engine may be arranged to use one or more well-known or custom key exchange protocols to share the OTS to the source file system and the target file system.

At block 606, in one or more of the various embodiments, the one or more replication engines may be arranged to sign authentication information that may be associated with the source file system with the OTS. In one or more of the various embodiments, the replication engine may determine the authentication information for the source file system. The particular information may depend on the type of secure channel that is intended for use. In some embodiments, replication engines may be arranged to refer to configuration to determine the particular information to include in the source authentication information. For example, if PKI certificates are going to be used, the replication engine may generate a fingerprint based one or more fields associated with the PKI certificate that identifies the source file system. In one or more of the various embodiments, the replication engine may be arranged to cryptographically sign the certificate fingerprint information using the OTS. In some embodiments, replication engines may be arranged to employ one or more well-known cryptographic operations to produce a hash-based message authentication code (HMAC) associated with or representing the source authentication information.

At block 608, in one or more of the various embodiments, the one or more replication engines may be arranged to provide a replication request message that includes the signed source authentication information to the target file system. In one or more of the various embodiments, the replication engine may communicate signed source authentication information to the target file system over the network. In one or more of the various embodiments, replication engine may be arranged to use various mechanisms to exchange communications with the source file system and the target file system, such as, TCP/IP sockets, HTTP APIs (e.g., REST APIs), or the like.

At block 610, in one or more of the various embodiments, the one or more replication engines may be arranged to authorize the replication request message at the target file system based on the OTS. In one or more of the various embodiments, the replication engine may use the OTS stored at the target file system to authorize the request to establish a replication request. If the replication request sent from the source file system is authorized, the replication request may be stored until the replication engine provides authorization request from the source file system.

At block 612, in one or more of the various embodiments, the one or more replication engines may be arranged to provide signed target authentication information to the source file system. In one or more of the various embodiments, the replication engine may provide an authorization request form the source file system that triggers the replication engine to provide authentication information associated with the target file system. Accordingly, in one or more of the various embodiments, the replication engine may cryptographically sign the target authentication information and communicate it to the source file system.

In one or more of the various embodiments, the replication engine may be arranged to generate the target authentication information by generating HMAC X based on the OTS, such as, Xtarget=H(OTS, FB|FA) where H is a cryptographically secure hashing function, OTTS is the one-time-secure, FB is the fingerprint information for the PKI certificate associated with the target file system and FA is the fingerprint information for the PKI certificate associated with the source file system. Accordingly, in some embodiments, the replication engine may communicate Xtarget and FB to the source file system.

At block 614, in one or more of the various embodiments, the one or more replication engines may be arranged to verify the signed target authentication information at the source file system. In one or more of the various embodiments, the replication engine may be arranged to verify the target authentication information based on the OTS. Continuing with the example from block 612, the replication engine may use FB as provided from the target file system, its FA, and the OTS to compute Xsource. Thus, in this example, if Xsource matches Xtarget, the target authentication information may be considered verified.

At block 616, in one or more of the various embodiments, the one or more replication engines may be arranged to provide a signed acknowledgment from the source file system to the target file system. For example, in one or more of the various embodiments, the acknowledgment may include Ysource=H(OTS, FA|FB) that is communicated to the target file system.

At block 618, in one or more of the various embodiments, the one or more replication engines may be arranged to authenticate the signed acknowledgment from the source file system as the target file system. Continuing with the example in block 616, the replication engine may be arranged to compute Ytarget at the target file system using the OTS, FA, and FB stored at the target file system. Accordingly, in some embodiments, if Ysource matches Ytarget, the secure communication channel may be considered to be successfully validated, authorized, or otherwise established.

At block 620, in one or more of the various embodiments, the one or more replication engines may be arranged to perform one or more replication operations over a the secure communication channel. In one or more of the various embodiments, replication engines may be arranged authenticate source file systems with target file system and target file systems with source file systems using the shared certificate fingerprint information to confirm the identity of the source file system or target file system by confirming that PKI certificates they provide match their respective fingerprints. Next, control may be returned to a calling process.

Figure 7:
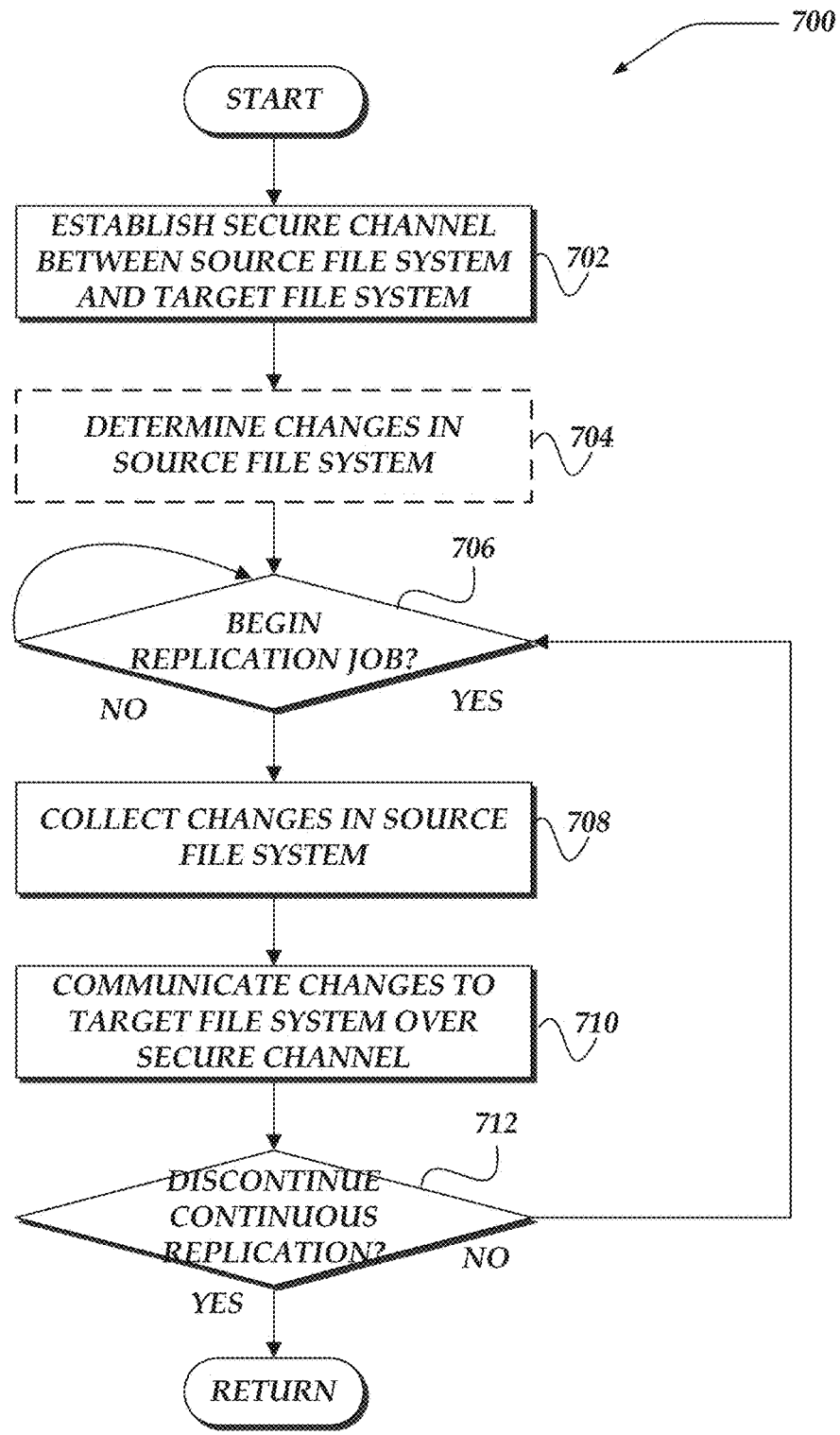
FIG. 7 illustrates a flowchart of a process for executing continuous replication jobs in accordance with one or more of the various embodiments.

FIG. 7 illustrates a flowchart of process 700 for executing continuous replication jobs in accordance with one or more of the various embodiments. After a start block, at block 702, in one or more of the various embodiments, one or more replication engines may be instantiated to establish a secure channel between a source file system and a target file system. See, FIG. 6 and accompanying description.

At block 704, in one or more of the various embodiments, optionally, determine changes in the source file system. In one or more of the various embodiments, replication engines may be arranged to determined various characteristics of a potential replication job before launching it. Accordingly, in one or more of the various embodiments, replication engines may be arranged to scan a source file system for changes to determine the characteristics of the replication job. In one or more of the various embodiments, the replication engine may be arranged to communicate with a file system engine to obtain the replication job characteristics rather than generating them on the fly. For example, in some embodiments, the file system engine may be arranged to maintain change records, change indices, log information, journal information, or the like, that it may use to quickly determine changes the replication engine may need to associate with a replication job.

At decision block 706, in one or more of the various embodiments, if a replication job should be started, control may flow to block 708; otherwise, control may loop back to decision block 706. In one or more of the various embodiments, replication engine may apply one or more rules (as described above) to determine if a replication job should be executed.

In one or more of the various embodiments, replication engines may be arranged to skip or pass a replication cycle if based on one or more characteristics of the potential replication job. Accordingly, in some embodiments, configuration information or other policy rules may define one or more conditions that may cause a replication cycle to be skipped. For example, in some embodiments, a replication engine may be configured to skip a replication cycle if the number of changed file system objects is below a threshold value.

At block 708, in one or more of the various embodiments, the one or more replication engines may be arranged to collect one or more changes in the source file system. In one or more of the various embodiments, the replication engine may trigger the file system engine to create a snapshot on the source file system that preserves the current state of the source file system. Accordingly, in one or more of the various embodiments, differences between the last snapshot and the new snapshot may be determined to be changes that should be collected.

In one or more of the various embodiments, collecting changes may include copying, caching, formatting, compressing, or the like, the data or information associated with changes in the source file system. Also, in one or more of the various embodiments, collection may be limited to obtaining or producing a catalog or list of changes in the source file system that are associated with a replication job.

At block 710, in one or more of the various embodiments, the one or more replication engines may be arranged to communicate the collected changes to the target file system over the secure channel. In one or more of the various embodiments, replication engines may be arranged to instantiate or execute replication jobs that may perform the network communication operations to the communicate the change data to the target file system.

At decision block 712, in one or more of the various embodiments, if the continuous replication relationship between the source file system and the target file system is discontinued, control may be returned to a calling process; otherwise, control may loop back to decision block 706. In one or more of the various embodiments, an established replication relationship may continue until it is explicitly terminated by rule or by a user. For example, in some embodiments, a replication relationship may be associated with rules that may define its lifespan, or the like. In other cases, the replication relationship may endure until a user terminates it via inputs through a user interface.

Also, in one or more of the various embodiments, replication engines may be arranged to terminate replication relationships based on various factors, such as, error rates, authentication failures, failure to communicate between the source file system and the target file system, rejection of replication jobs by the target file system, or the like.

Figure 8:
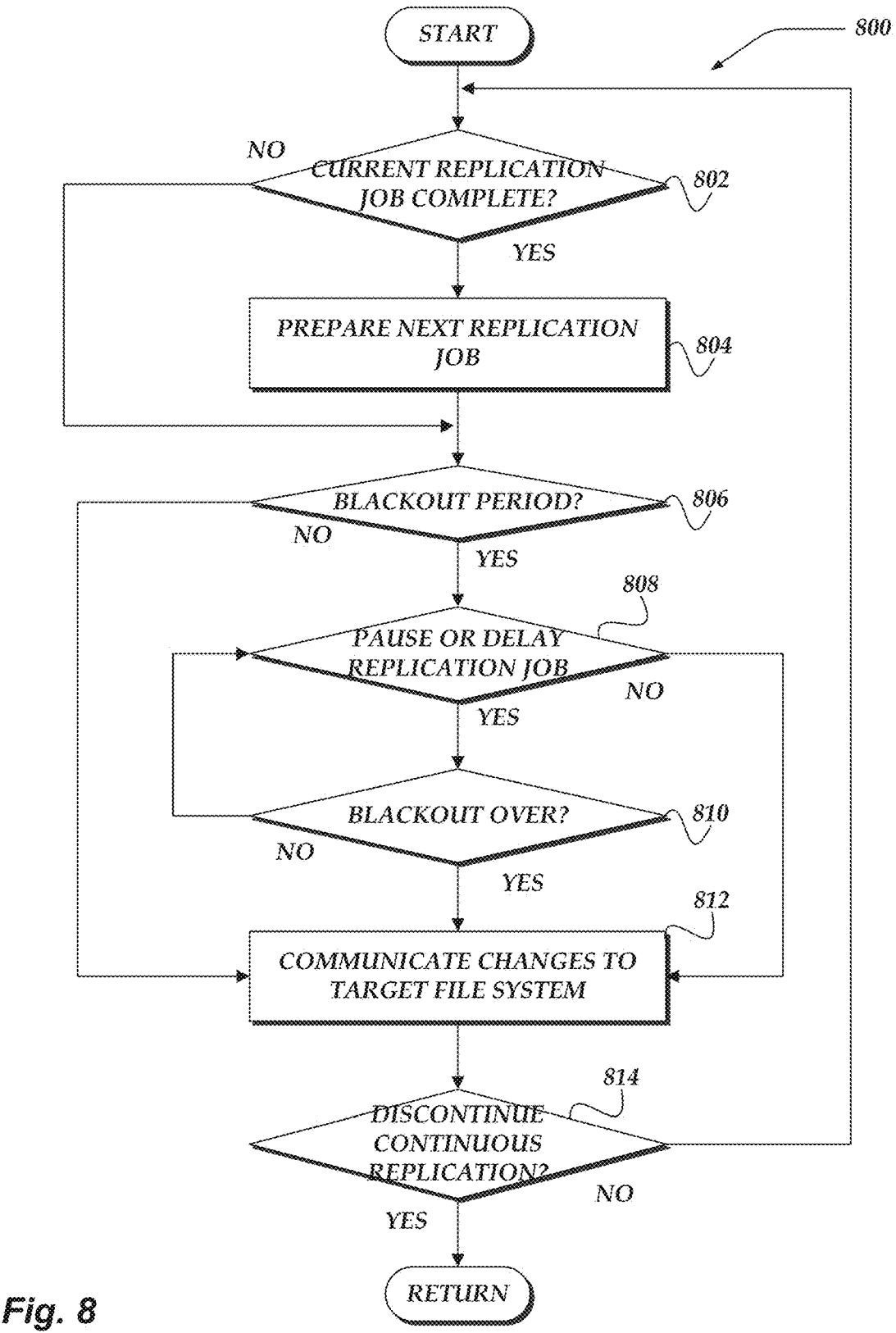
FIG. 8 illustrates a flowchart of a process for enforcing blackout conditions if executing continuous replication jobs in accordance with one or more of the various embodiments.

FIG. 8 illustrates a flowchart of process 800 for enforcing blackout conditions if executing continuous replication jobs in accordance with one or more of the various embodiments. After a start block, at decision block 802, in one or more of the various embodiments, if a current replication job is complete, control may flow to decision block 806; otherwise, control may flow to block 804.

At block 804, in one or more of the various embodiments, one or more replication engines may be instantiated to prepare a next replication job. In one or more of the various embodiments, preparing the next job may include collecting one or more job characteristics, such as, job size (e.g., how long will it take to run), metrics associated with the operating environment, metrics associated with the source file system, metrics associated with the target file system, or the like.

At decision block 806, in one or more of the various embodiments, if there is a blackout period impending or pending, control may flow to decision block 808; otherwise, control may flow to block 812. In one or more of the various embodiments, there may be one or more fixed black-out periods or one or more rule-based black-out periods that may be determined to have the potential to impact the replication job. For example, in some embodiments, the pending replication job may be determined to have an expected run-time that impinges on an upcoming black-out period. Or, in another example, a black-out period may be active when the new replication job is ready to start.

At decision block 808, in one or more of the various embodiments, if the replication job may be paused or delayed, control may flow to decision block 810; otherwise, control may flow to block 812. In one or more of the various embodiments, as discussed above, there may be one or more rules associated with one or more of the replication engine, the source file system, the target file system, the replication job, the black-out period, or the like, that may need to be applied to determine how to proceed in the face of the black-out period.

In one or more of the various embodiments, depending on the rules associated with one or more of the replication engine, the source file system, the target file system, the replication job, the black-out period, or the like, the replication job may be delayed if it is a new replication job that has not started running. Or, in one or more of the various embodiments, the replication engine may be arranged to allow a replication job that is a currently running job to run to completion or cause it to be paused depending the applicable rules or configuration information. For example, in one or more of the various embodiments, a replication engine may be arranged to enable a currently running replication job to run to completion if it is estimated to finish before 10% of the black-out period has elapsed. Otherwise, in this example, the replication engine may be arranged to pause the currently running replication job until the black-out period is over.

At decision block 810, in one or more of the various embodiments, if the black-out period is over, control may flow to block 812; otherwise, control may loop back decision block 808.

At block 812, in one or more of the various embodiments, the one or more replication engines may be arranged to communicate one or more changes in the source file system to the target file system. In one or more of the various embodiments, delayed replication jobs may be started or paused replication jobs may be restarted.

In one or more of the various embodiments, the execution of a replication job may be modified depending on one or more performance metrics that may be associated with the source file system, the target file system, intervening networks, or the like. Accordingly, in one or more of the various embodiments, a replication engine may be arranged to increase or decrease the amount of one or more resources (e.g., compute resources, storage resources, communication/networking resources, or the like) allocated to a given replication job. In one or more of the various embodiments, the modifications to be performed may be obtained from configuration information, rules, or user input. For example, in one or more of the various embodiments, a replication engine may be arranged to slow the transmission rate of a replication job if the processor utilization of one or more source file system servers exceed a defined threshold value.

At decision block 814, in one or more of the various embodiments, if the continuous replication relationship between the source file system and the target file system is discontinued, control may be returned to a calling process; otherwise, control may loop back to decision block 802.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    instantiating a replication engine to perform actions, including:
        establishing a secure communication channel between a source file system and a target file system based on one or more handshake messages, wherein the one or more handshake messages include source authentication information and target authentication information, and wherein a one-time-secret (OTS) based on entropy information collected by one or more sensors is shared with both the source file system and the target file system for verifying the source authentication information and the target authentication information;
        instantiating a replication job that is associated with one or more rules;
        determining one or more changes in the source file system;
        determining one or more characteristics of the replication job based on the one or more changes;
        comparing the one or more rules to the one or more characteristics and a black-out schedule;
        providing a minimum delay between each replication job, wherein the minimum delay is based on an age of the one or more changes;
        in response to the age of the one or more changes being less than the minimum delay, delaying the execution of the next replication job;
        executing the replication job to communicate the one or more changes in the source file system to the target file system based on a result of the comparison; and
        in response to completion of the replication job, automatically instantiating a next replication job to copy subsequent changes in the source file system to the target file system.

2. The method of claim 1, wherein executing the replication job further comprises:
    modifying the execution of the replication job based on one or more metrics that include one or more of a processor utilization value, a network utilization value, a network quality value, a number of the one or more changes, or a size of the one or more changes, wherein modifying the execution includes one or more of delaying the execution of the replication job until the expiry of a black-out period, skipping a replication cycle, or modifying an amount of one or more resources that are allocated to the replication job.

3. The method of claim 1, wherein the replication engine performs further actions, comprising:
pausing the execution of the replication job to avoid communicating the one or more changes during a black-out period; and
restarting execution of the replication job at the conclusion of the black-out period.

4. The method of claim 1, wherein establishing the secure channel further comprises:
verifying the target authentication information at the source file system;
verifying the source authentication information at the target file system; and
communicating an acknowledgement message from the source file system to the target file system, wherein the secure communication channel is established after the acknowledgement message is verified at the target file system.

5. The method of claim 1, wherein the replication engine performs further actions, comprising:
providing a snapshot of the source file system that is associated with a current state of the source file system; and
restricting the one or more changes to changes associated with the snapshot.

6. The method of claim 1, wherein the source authentication information is signed using a one-time-secret (OTS) and the target authentication information is signed using the same OTS.

7. A system for managing data in a file system comprising:
a network computer, comprising:
a transceiver that communicates over the network;
a memory that stores at least instructions; and
one or more processors that execute instructions that perform actions, including:
instantiating a replication engine to perform actions, including:
establishing a secure communication channel between a source file system and a target file system based on one or more handshake messages, wherein the one or more handshake messages include source authentication information and target authentication information, and wherein a one-time-secret (OTS) based on entropy information collected by one or more sensors is shared with both the source file system and the target file system for verifying the source authentication information and the target authentication information;
instantiating a replication job that is associated with one or more rules;
determining one or more changes in the source file system;
determining one or more characteristics of the replication job based on the one or more changes;
comparing the one or more rules to the one or more characteristics and a black-out schedule;
providing a minimum delay between each replication job, wherein the minimum delay is based on an age of the one or more changes;
in response to the age of the one or more changes being less than the minimum delay, delaying the execution of the next replication job;
executing the replication job to communicate the one or more changes in the source file system to the target file system based on a result of the comparison; and
in response to completion of the replication job, automatically instantiating a next replication job to copy subsequent changes in the source file system to the target file system; and
a client computer, comprising:
a transceiver that communicates over the network;
a memory that stores at least instructions; and
one or more processors that execute instructions that perform actions, including:
providing a replication request message to the replication engine.

8. The system of claim 7, wherein executing the replication job further comprises:
modifying the execution of the replication job based on one or more metrics that include one or more of a processor utilization value, a network utilization value, a network quality value, a number of the one or more changes, or a size of the one or more changes, wherein modifying the execution includes one or more of delaying the execution of the replication job until the expiry of a black-out period, skipping a replication cycle, or modifying an amount of one or more resources that are allocated to the replication job.

9. The system of claim 7, wherein the replication engine performs further actions, comprising:
pausing the execution of the replication job to avoid communicating the one or more changes during a black-out period; and
restarting execution of the replication job at the conclusion of the black-out period.

10. The system of claim 7, wherein establishing the secure channel further comprises:
verifying the target authentication information at the source file system;
verifying the source authentication information at the target file system; and
communicating an acknowledgement message from the source file system to the target file system, wherein the secure communication channel is established after the acknowledgement message is verified at the target file system.

11. The system of claim 7, wherein the replication engine performs further actions, comprising:
providing a snapshot of the source file system that is associated with a current state of the source file system; and
restricting the one or more changes to changes associated with the snapshot.

12. The system of claim 7, wherein the source authentication information is signed using a one-time-secret (OTS) and the target authentication information is signed using the same OTS.

13. A processor readable non-transitory storage media that includes instructions for managing data in a file system over a network, wherein execution of the instructions by one or more processors on one or more network computers performs actions, comprising:
instantiating a replication engine to perform actions, including:
establishing a secure communication channel between a source file system and a target file system based on one or more handshake messages, wherein the one or more handshake messages include source authentication information and target authentication information, and wherein a one-time-secret (OTS) based on entropy information collected by one or more sensors is shared with both the source file system and the target file system for verifying the source authentication information and the target authentication information;

instantiating a replication job that is associated with one or more rules;

determining one or more changes in the source file system;

determining one or more characteristics of the replication job based on the one or more changes;

comparing the one or more rules to the one or more characteristics and a black-out schedule;

providing a minimum delay between each replication job, wherein the minimum delay is based on an age of the one or more changes;

in response to the age of the one or more changes being less than the minimum delay, delaying the execution of the next replication job;

executing the replication job to communicate the one or more changes in the source file system to the target file system based on a result of the comparison; and in response to completion of the replication job, automatically instantiating a next replication job to copy subsequent changes in the source file system to the target file system.

14. The media of claim 13, wherein executing the replication job further comprises:

modifying the execution of the replication job based on one or more metrics that include one or more of a processor utilization value, a network utilization value, a network quality value, or a size of the one or more changes, wherein modifying the execution includes one or more of delaying the execution of the replication job until the expiry of a black-out period, skipping a replication cycle, or modifying an amount of one or more resources that are allocated to the replication job.

15. The media of claim 13, wherein the replication engine performs further actions, comprising:

pausing the execution of the replication job to avoid communicating the one or more changes during a black-out period; and restarting execution of the replication job at the conclusion of the black-out period.

16. The media of claim 13, wherein establishing the secure channel further comprises:

verifying the target authentication information at the source file system;

verifying the source authentication information at the target file system; and communicating an acknowledgement message from the source file system to the target file system, wherein the secure communication channel is established after the acknowledgement message is verified at the target file system.

17. The media of claim 13, wherein the source authentication information is signed using a one-time-secret (OTS) and the target authentication information is signed using the same OTS.

18. A network computer for managing data in a file system, comprising:

a transceiver that communicates over the network;

a memory that stores at least instructions; and one or more processors that execute instructions that perform actions, including:

instantiating a replication engine to perform actions, including:

establishing a secure communication channel between a source file system and a target file system based on one or more handshake messages, wherein the one or more handshake messages include source authentication information and target authentication information, and wherein a one-time-secret (OTS) based on entropy information collected by one or more sensors is shared with both the source file system and the target file system for verifying the source authentication information and the target authentication information;

instantiating a replication job that is associated with one or more rules;

determining one or more changes in the source file system;

determining one or more characteristics of the replication job based on the one or more changes;

comparing the one or more rules to the one or more characteristics and a black-out schedule;

providing a minimum delay between each replication job, wherein the minimum delay is based on an age of the one or more changes;

in response to the age of the one or more changes being less than the minimum delay, delaying the execution of the next replication job;

executing the replication job to communicate the one or more changes in the source file system to the target file system based on a result of the comparison; and in response to completion of the replication job, automatically instantiating a next replication job to copy subsequent changes in the source file system to the target file system.

19. The network computer of claim 18, wherein executing the replication job further comprises:

modifying the execution of the replication job based on one or more metrics that include one or more of a processor utilization value, a network utilization value, a network quality value, a number of the one or more changes, or a size of the one or more changes wherein modifying the execution includes one or more of delaying the execution of the replication job until the expiry of a black-out period, or skipping a replication cycle, or modifying an amount of one or more resources that are allocated to the replication job.

20. The network computer of claim 18, wherein the replication engine performs further actions, comprising:

pausing the execution of the replication job to avoid communicating the one or more changes during a black-out period; and restarting execution of the replication job at the conclusion of the black-out period.

21. The network computer of claim 18, wherein establishing the secure channel further comprises:

verifying the target authentication information at the source file system;

verifying the source authentication information at the target file system; and communicating an acknowledgement message from the source file system to the target file system, wherein the secure communication channel is established after the acknowledgement message is verified at the target file system.

22. The network computer of claim 18, wherein the replication engine performs further actions, comprising:
  providing a snapshot of the source file system that is associated with a current state of the source file system; and
  restricting the one or more changes to changes associated with the snapshot.

\* \* \* \* \*